US008773461B2

(12) United States Patent
Kim

(10) Patent No.: US 8,773,461 B2
(45) Date of Patent: Jul. 8, 2014

(54) DIGITAL IMAGE PROCESSING APPARATUS AND METHOD FOR RAPIDLY CHANGING A DISPLAYED IMAGE

(75) Inventor: Sung-jun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1170 days.

(21) Appl. No.: 12/535,810

(22) Filed: Aug. 5, 2009

(65) Prior Publication Data
US 2010/0033500 A1  Feb. 11, 2010

(30) Foreign Application Priority Data
Aug. 6, 2008  (KR) .................. 10-2008-0077053

(51) Int. Cl.
*G09G 5/00*  (2006.01)
(52) U.S. Cl.
USPC .......................................... 345/629; 345/619
(58) Field of Classification Search
None
See application file for complete search history.

(56) References Cited

U.S. PATENT DOCUMENTS

| 5,512,918 | A  | * | 4/1996 | Forrest et al. ................. 345/473 |
| 6,496,187 | B1 | * | 12/2002 | Deering et al. ............... 345/419 |
| 2002/0145610 | A1 | * | 10/2002 | Barilovits et al. ............. 345/538 |
| 2009/0185053 | A1 | * | 7/2009 | Ejima et al. ............. 348/231.99 |

FOREIGN PATENT DOCUMENTS

WO    WO 2007122811 A1 * 11/2007

* cited by examiner

*Primary Examiner* — Jwalant Amin
(74) *Attorney, Agent, or Firm* — Drinker Biddle & Reath LLP

(57) ABSTRACT

A digital image processing apparatus may display an image that can be converted into other images by using a rapid sliding method. The digital image processing apparatus may include a storage medium in which a first image file and a second image file are stored and a buffer in which information about a first synthesized image, including a first image corresponding to the first image file and a second image corresponding to the second image file disposed adjacent to each other, is stored. The digital image processing apparatus may further include a display unit that displays at least one of the first image, a first partial synthesized image, and the second image by using a piece of the information about the first synthesized image. The first partial synthesized image may include a portion of the first image and a portion of the second image disposed adjacent to each other.

24 Claims, 7 Drawing Sheets

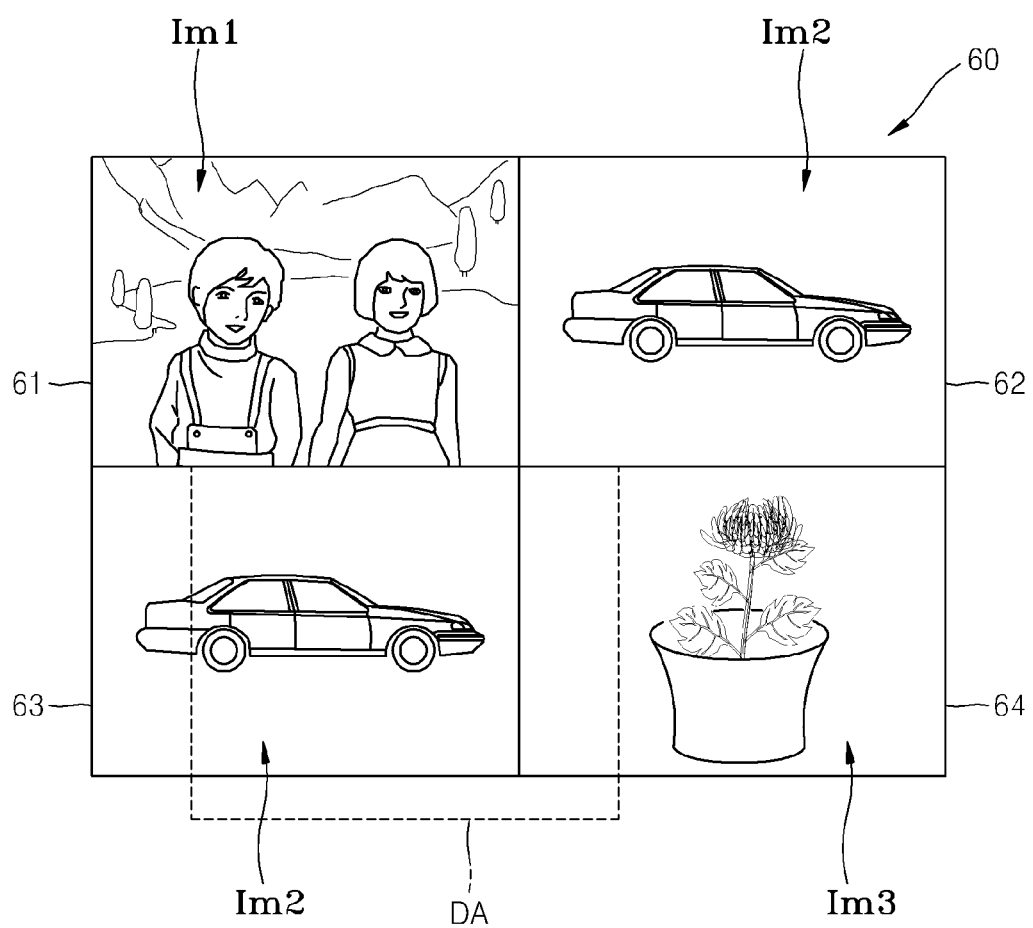

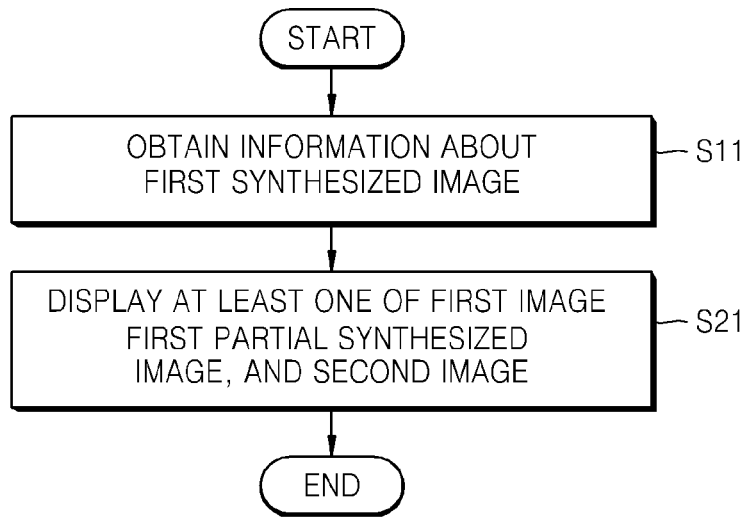
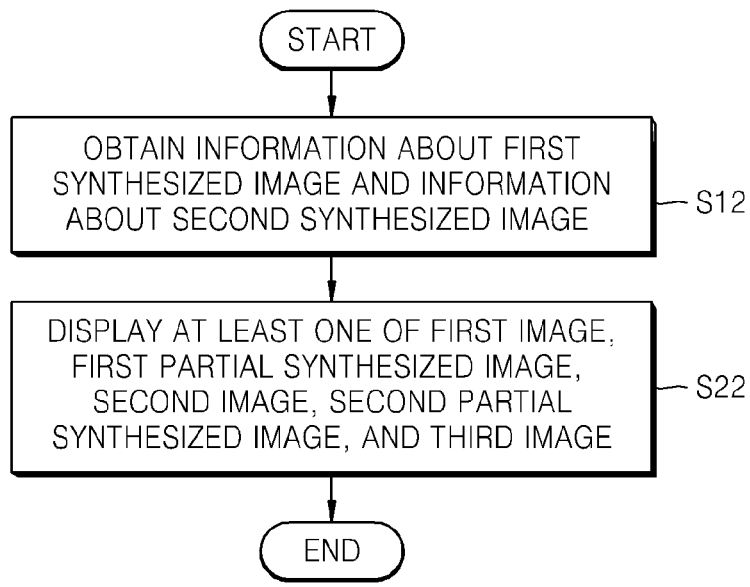

DIGITAL IMAGE PROCESSING APPARATUS AND METHOD FOR RAPIDLY CHANGING A DISPLAYED IMAGE

CROSS-REFERENCE TO RELATED PATENT APPLICATIONS

This application claims the priority benefit of Korean Patent Application No. 10-2008-0077053, filed on Aug. 6, 2008, in the Korean Intellectual Property Office, the disclosure of which is incorporated herein in its entirety by reference.

BACKGROUND

1. Field of the Invention

The present invention relates to a digital image processing apparatus and method, and more particularly, to a digital image processing apparatus and method in which a displayed image can be converted into other images by using a rapid sliding method.

2. Description of the Related Art

Typical digital image processing apparatuses reproduce an image file stored in a storage medium and display an image generated from image data on a display unit. Digital imaging apparatuses, which are types of digital image processing apparatuses, typically image a subject in an imaging mode, store image data in a storage medium, reproduce an image file stored in the storage medium, and display an image generated from the image data on a display unit.

FIGS. 1 and 2 are schematic views illustrating an operation of processing an image by a conventional digital image processing apparatus. Image files 1 and 2 are stored in a storage medium 3 of the conventional digital image processing apparatus. For example, when an image corresponding to the image file 1 is displayed on a display unit 6, information about the image corresponding to the image file 1 (hereinafter referred to as image 1') stored in the storage medium 3 is stored in a buffer 4. When the image file 1 is a coded file, the image file 1 is decoded, and information about the image 1' is stored in the buffer 4. Thereafter, a display interface unit 5 reads the information that is stored in the buffer 4 and displays an image on the display unit 6.

As illustrated in FIG. 1, when the image that is displayed on the display unit 6 is converted into other images so as to display an image corresponding to the image file 2 (hereinafter referred to as image 2') on the display unit 6 when the image 1' stored in the storage medium 3 is displayed on the display unit 6, the image 1' is converted into the image 2' in a sliding manner for aesthetic purposes, etc. In other words, the percentage of the image 1' displayed on the display unit 6 is gradually decreased, and simultaneously, the percentage of the image 2' displayed on the display unit 6 is gradually increased.

In this case, information about a synthesized image, in which a portion of the image 1' and a portion of the image 2' are disposed adjacent to each other, is obtained from the image file 1 and the image file 2 that are stored in the storage medium 3. The information about the synthesized image is then stored in the buffer 4, and a display interface unit 5 reads the information stored in the buffer 4 and displays the synthesized image in which a portion of the image 1' and a portion of the image 2' are disposed adjacent to each other on the display unit 6, as illustrated in FIG. 2. Thus, in order to smoothly convert the image 1' displayed on the display unit 6 into the image 2' in a sliding manner when the image 1' is displayed on the display unit 6, operations of obtaining information about a synthesized image must be repeatedly performed. For example, when the ratio of the percentage of the image 1' to the percentage of the image 2' displayed on the display unit 6 is A, the operations of obtaining information from the image file 1 and the image file 2 that are stored in the storage medium 3 to produce the synthesized image with the ratio A, storing the information in the buffer 4, and displaying the synthesized image on the display unit 6 by using the information, are performed. Then, when the ratio of the percentage of the image 1' to the percentage of the image 2' displayed on the display unit 6 is B, the operations of obtaining information from the image file 1 and the image file 2 that are stored in the storage medium 3, storing the information in the buffer 4, and displaying the synthesized image on the display unit 6 by using the information, are performed. These operations are performed repeatedly for each different ratio of the percentage of the image 1' to the percentage of the image 2' displayed on the display unit 6. Thus, in the conventional digital image processing apparatus, converting a displayed image into other images in a rapid sliding manner is not easy because of the need to read and process a large amount of data. In addition, hardware with high specification requirements for reading and processing a large amount of data is needed.

SUMMARY

A digital image processing apparatus may display an image that can be converted into other images by using a rapid sliding method. A computer readable storage medium may include a program executable by a processor to perform a method of controlling a digital image processing apparatus to display an image and convert the displayed image into other images by using a rapid sliding method.

The digital image processing apparatus may include a storage medium in which a first image file and a second image file are stored. The digital image processing apparatus may also include a buffer in which information about a first synthesized image is stored. The first synthesized image may comprise a first image corresponding to the first image file and a second image corresponding to the second image file disposed adjacent to each other. The information may be obtained from the first image file and the second image file. The digital image processing apparatus may also include a display unit that displays at least one of the first image, a first partial synthesized image, and the second image by using a piece of the information about the first synthesized image. The first partial synthesized image may include a portion of the first image and a portion of the second image disposed adjacent to each other.

The apparatus may further include a display interface unit that reads a piece of the information about the first synthesized image, which may be stored in the buffer. The display unit may display at least one of the first image, the first partial synthesized image, and the second image using information that is read by the display interface unit.

When the display unit displaying one of the first image, the first partial synthesized image, and the second image begins to display another one of the first image, the first partial synthesized image, and the second image, a piece of the information about the first synthesized image, which may be stored in the buffer, may be used.

When the percentage displayed of the first image in the first partial synthesized image varies during display of the first partial synthesized image, a piece of the information about the first synthesized image, which may be stored in the buffer, may be used.

A third image file may be stored in the storage medium, and information about a second synthesized image may be stored in the buffer. The second synthesized image may include the second image and a third image corresponding to a third image file disposed adjacent to each other, and the display unit may display at least one of the first image, the first partial synthesized image, the second image, a second partial synthesized image, and the third image by using a piece of the information about the first synthesized image and the information about the second synthesized image, which may be stored in the buffer. The second partial synthesized image may include a portion of the second image and a portion of the third image disposed adjacent to each other.

The apparatus may further include a display interface unit that reads a piece of the information about the first synthesized image and the information about the second synthesized image, which may be stored in the buffer. The display unit may display at least one of the first image, the first partial synthesized image, the second image, the second partial synthesized image, and the third image using information that is read by the display interface unit.

When the display unit displaying one of the first image, the first partial synthesized image, the second image, the second partial synthesized image, and the third image begins to display another one of the first image, the first partial synthesized image, the second image, the second partial synthesized image, and the third image, a piece of the information about the first synthesized image and the information about the second synthesized image, which may be stored in the buffer, may be used.

When the percentage displayed of the first image in the first partial synthesized image during display of the first partial synthesized image varies, or when the percentage displayed of the second image in the second partial synthesized image during display of the second partial synthesized image varies, a piece of the information about the first synthesized image and the information about the second synthesized image, which may be stored in the buffer, may be used.

The buffer may include first through fourth regions. The first region and the second region may be adjacent to each other. Likewise, the third region and the fourth region may be adjacent to each other. Information about the first image and information about the second image may be stored in the first region and the second region respectively such that the information about the first synthesized image can be stored in the first region and the second region, and information about the second image and information about the third image may be stored in the third region and the fourth region respectively such that the information about the second synthesized image can be stored in the third region and the fourth region.

A fourth image file may be stored in the storage medium, and when the display unit displays the third image, the information about the third image and information about a fourth image corresponding to the fourth image file may be stored in the first region and the second region of the buffer respectively, such that information about a third synthesized image can be stored in the first region and the second region. The third synthesized image may include the third image and the fourth image disposed adjacent to each other.

A fourth image file may be stored in the storage medium, and when the percentage displayed of the second image in the second partial synthesized image is less than or equal to a predetermined percentage during display of the second partial synthesized image, the information about the third image and information about the fourth image may be stored in the first region and the second region of the buffer, respectively, such that information about a third synthesized image can be stored in the first region and the second region. The third synthesized image may include the third image and the fourth image disposed adjacent to each other.

A method of controlling a digital image processing apparatus may include obtaining information about a first synthesized image, in which a first image corresponding to a first image file and a second image corresponding to a second image file are disposed adjacent to each other, from the first image file and the second image file. The method may also include displaying at least one of the first image, a first partial synthesized image, and the second image on a display unit by using a piece of the information about the first synthesized image. The first partial synthesized image may include a portion of the first image and a portion of the second image disposed adjacent to each other.

The displaying of the at least one of the first image, the first partial synthesized image, and the second image may include sequentially displaying the first image, the first partial synthesized image, and the second image on the display unit. When the first partial synthesized image is being displayed on the display unit, the percentage displayed of the first image in the first partial synthesized image may vary over time.

The displaying of the at least one of the first image, the first partial synthesized image, and the second image on the display unit may be in response to a signal that is input by a user.

When the first partial synthesized image is being displayed on the display unit, the percentage displayed of the first image in the first partial synthesized image may vary in response to a signal that is input by the user.

The obtaining of the information about the first synthesized image may further include storing the information in a buffer. The displaying of the at least one of the first image, the first partial synthesized image, and the second image on the display unit may include using a piece of the information about the first synthesized image, which may be stored in the buffer.

When one of the first image, the first partial synthesized image, and the second image is displayed on the display unit and another one of the first image, the first partial synthesized image, and the second image begins to be displayed, a piece of the information about the first synthesized image, which may be stored in the buffer, may be used.

When the percentage displayed of the first image in the first partial synthesized image varies during display of the first partial synthesized image, a piece of the information about the first synthesized image, which may be stored in the buffer, may be used.

A method of controlling a digital image processing apparatus may include obtaining information about a first synthesized image from a first image file and a second image file. The first synthesized image may include a first image corresponding to the first image file and a second image corresponding to the second image file disposed adjacent to each other. The method may also include obtaining information about a second synthesized image from the second image file and a third image file. The second synthesized image may include the second image and a third image corresponding to the third image file disposed adjacent to each other. The method may further include displaying at least one of the first image, a first partial synthesized image, the second image, a second partial synthesized image, and the third image on a display unit by using a piece of the information about the first synthesized image and the information about the second synthesized image. The first partial synthesized image may include a portion of the first image and a portion of the second image disposed adjacent to each other, and the second partial synthesized image may include a portion of the second image and a portion of the third image disposed adjacent each other.

The displaying of the at least one of the first image, the first partial synthesized image, the second image, the second partial synthesized image, and the third image may include sequentially displaying the first image, the first partial synthesized image, the second image, the second partial synthesized image, and the third image on the display unit. When the first partial synthesized image is being displayed on the display unit, the percentage displayed of the first image in the first partial synthesized image may vary over time. When the second partial synthesized image is being displayed on the display unit, the percentage displayed of the second image in the second partial synthesized image may vary over time.

At least one of the first image, the first partial synthesized image, the second image, the second partial synthesized, and the third image may be displayed on the display unit in response to a signal that is input by a user.

During display of the first partial synthesized image, the percentage displayed of the first image in the first partial synthesized image may vary in response to a signal that is input by the user, and during display of the second partial synthesized image, the percentage displayed of the second image in the second partial synthesized image may vary in response to a signal that is input by the user.

The obtaining of the information about the first synthesized image and the information about the second synthesized image may further include storing the information about the first synthesized image and the information about the second synthesized image in a buffer, and the displaying of the at least one of the first image, the first partial synthesized image, the second image, the second partial synthesized image, and the third image on the display unit may include using a piece of the information about the first synthesized image and the information about the second synthesized image, which may be stored in the buffer.

When one of the first image, the first partial synthesized image, the second image, the second partial synthesized image, and the third image is displayed on the display unit and another one of the first image, the first partial synthesized image, the second image, the second partial synthesized image, and the third image begins to be displayed, a piece of the information about the first synthesized image and the information about the second synthesized image, which may be stored in the buffer, may be used.

When the percentage displayed of the first image in the first partial synthesized image varies during display of the first partial synthesized image or when the percentage displayed of the second image in the second partial synthesized image varies during display of the second partial synthesized image, a piece of the information about the first synthesized image and the information about the second synthesized image, which may be stored in the buffer, may be used.

The obtaining of the information about the first synthesized image and the information about the second synthesized image may include dividing the buffer into first through four regions, storing information about the first image and information about the second image in adjacent first and second regions respectively such that the information about the first synthesized image can be stored in the first region and the second region, and storing information about the second image and information about the third image in adjacent third and fourth regions respectively such that the information about the second synthesized image can be stored in the third region and the fourth region.

The method may further include, when the third image is displayed on the display unit, storing information about the third image and information about the fourth image in the first and second regions of the buffer respectively such that the information about a third synthesized image can be stored in the first region and the second region. The third synthesized image may include the third image and the fourth image disposed adjacent to each other.

The method may further include, when the percentage displayed of the second image in the second partial synthesized image is less than or equal to a predetermined percentage during display of the second partial synthesized image, storing the information about the third image and the information about the fourth image in the first region and the second region of the buffer respectively such that the information about the third synthesized image can be stored in the first region and the second region. The third synthesized image may include the third image and the fourth image disposed adjacent to each other.

BRIEF DESCRIPTION OF THE DRAWINGS

FIGS. 5A through 5C are additional exemplary schematic views illustrating images stored in the buffer of a digital image processing apparatus and portions to be read from the buffer.

FIG. 6 is a flowchart illustrating an exemplary method of controlling a digital image processing apparatus.

FIG. 7 is a flowchart illustrating another exemplary method of controlling a digital image processing apparatus.

DETAILED DESCRIPTION

Figure 3:
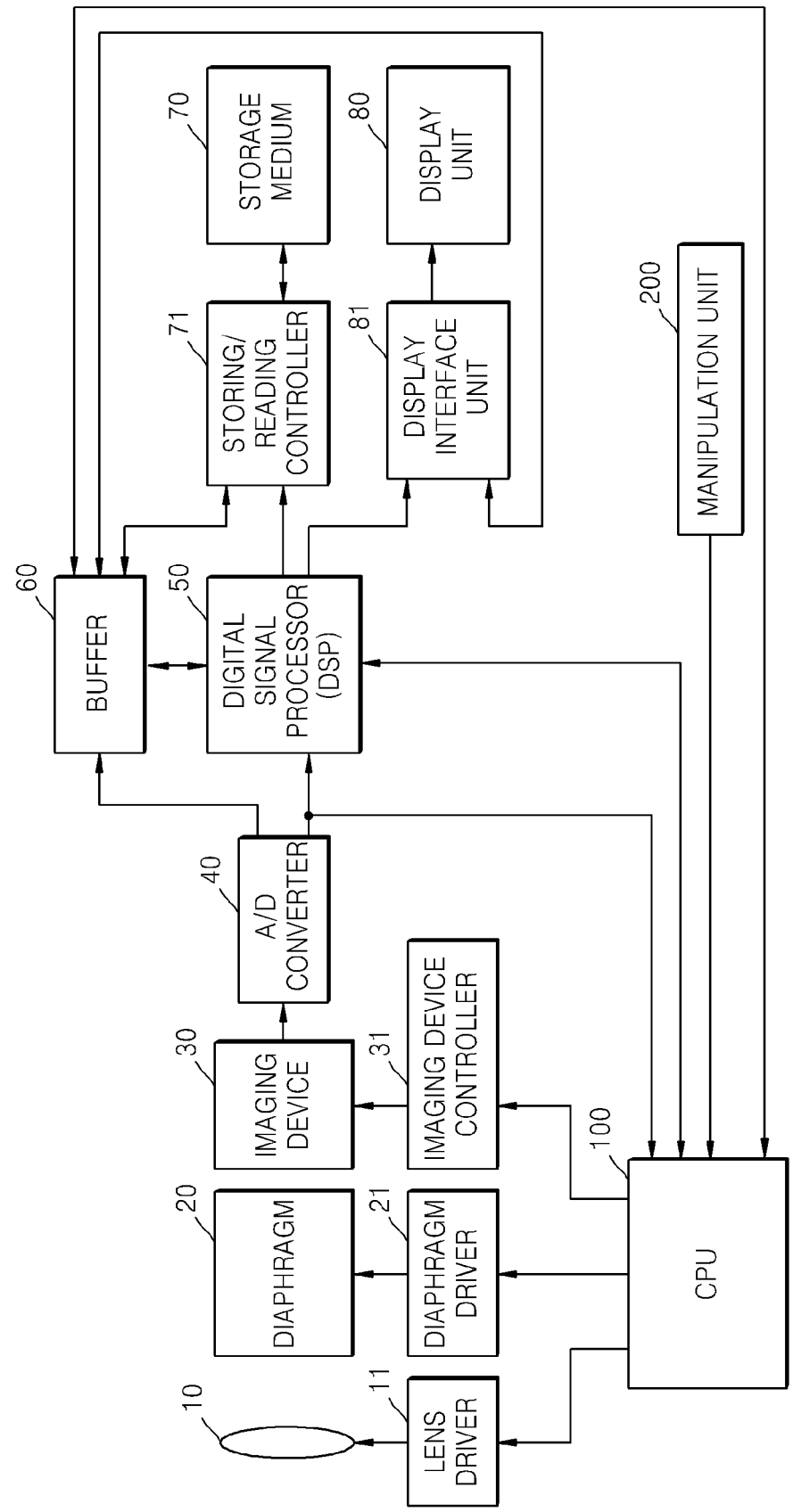
FIG. 3 is a schematic block diagram of an exemplary digital image processing apparatus.

FIG. 3 is a schematic block diagram of an exemplary digital image processing apparatus. The exemplary digital image processing apparatus may include a digital imaging apparatus. The overall operation of the digital imaging apparatus may be controlled by a central processing unit (CPU) 100. The digital imaging apparatus may comprise a manipulation unit 200 comprising keys, etc., to generate an electrical signal in response to an input by a user. The electrical signal generated by the manipulation unit 200 may be transmitted to the CPU 100 such that the CPU 100 may control the digital imaging apparatus in response to the electrical signal.

In an imaging mode, as the electrical signal generated in response to input by the user is input to the CPU 100, the CPU 100 may analyze the electrical signal and in response thereto, control a lens driver 11, a diaphragm driver 21, and an imaging device controller 31. The lens driver 11 may control a focus by controlling a position of a lens 10 according to a control signal received from the CPU 100. The lens 10 may allow image light of an object to be imaged to pass therethrough and focus the image light onto an imaging device 30. The diaphragm driver 21 may control a degree of openness of a diaphragm 20 according to a control signal received from the CPU 100. The diaphragm 20 may control an amount of light from the lens 10 which passes through to the imaging device 30. The imaging device controller 31 may control a sensitivity of the imaging device 30 in response to a control signal received from the CPU 100.

The imaging device 30 may generate image data from an input light, e.g., the image light of the object to be imaged. An optional analog to digital (A/D) converter 40 may convert analog data output by the imaging device 30 into digital data. The A/D converter 40 may not be needed depending on the characteristics of the imaging device 30.

The digital data that is output by the imaging device 30 may be input to a digital signal processor (DSP) 50 via a buffer 60 or directly to the DSP 50. The digital data may also be input to the CPU 100. The buffer 60 may include memory, for example read only memory (ROM) or random access memory (RAM). The DSP 50 may perform digital signal processing, such as gamma correction, white balance adjustment, etc.

The image data that is output by the DSP 50 may be transmitted to a display interface unit 81 via the buffer 60 or directly to the display interface unit 81 so that an image can be displayed on a display unit 80. The image data that is output by the DSP 50 may be input to a storing/reading controller 71 via the buffer 60 or directly to the storing/reading controller 71. The storing/reading controller 71 may store the image data in a storage medium 70 in response to a signal that is input by the user or automatically. The storing/reading controller 71 may read the image data from an image file stored in the storage medium 70 and input the image data to the display interface unit 81 via the buffer 60 so that an image can be displayed on the display unit 80. The storage medium 70 may be detachable or may be integrated with the digital imaging apparatus.

Figure 4A:
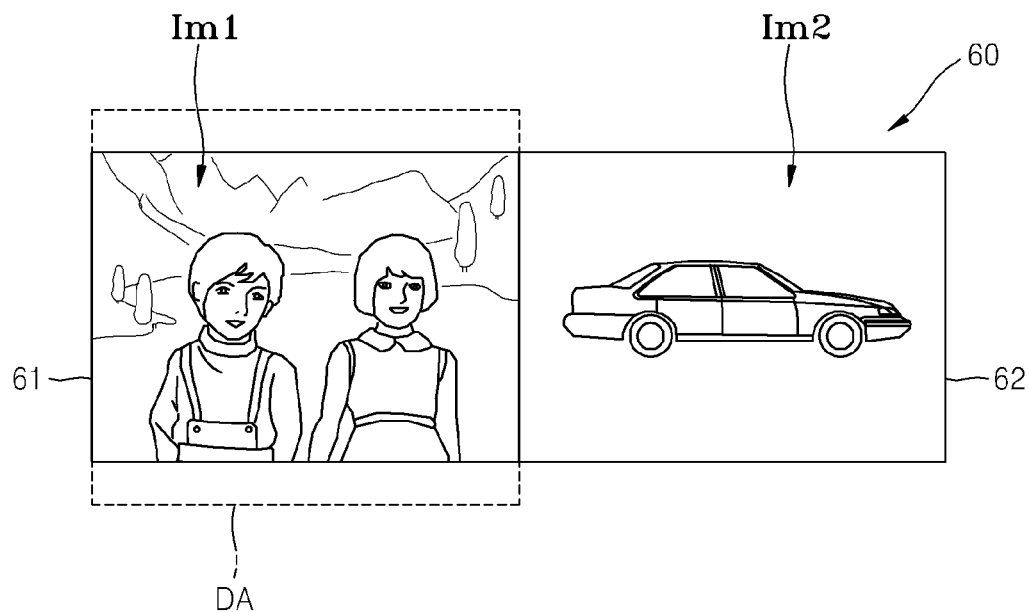
FIGS. 4A and 4B are exemplary schematic views illustrating images stored in a buffer of the digital image processing apparatus of FIG. 3 and portions to be read from the buffer.
Figure 4B:
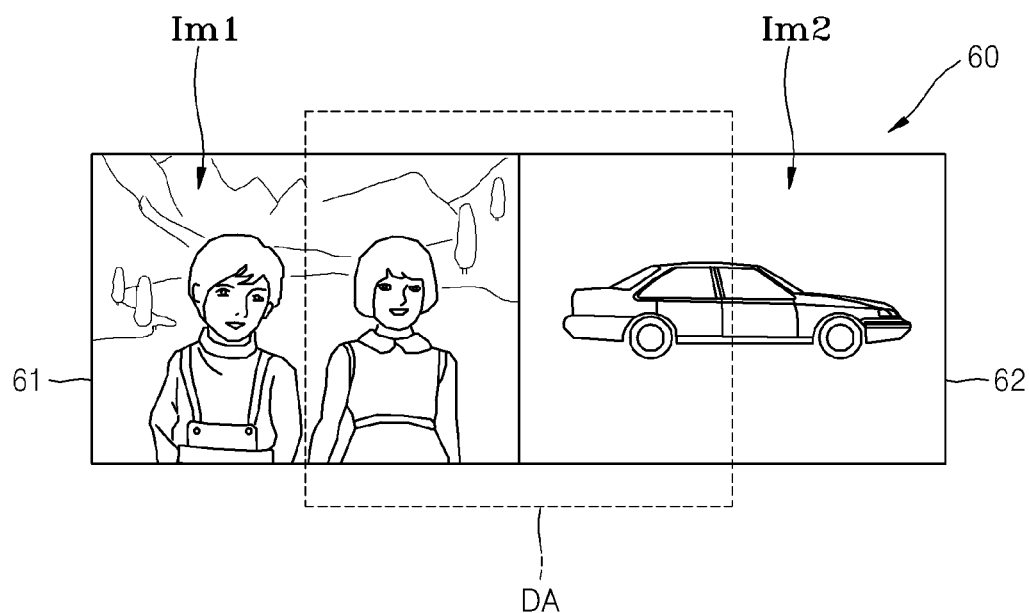

FIGS. 4A and 4B are exemplary schematic views illustrating images stored in a buffer 60 of the digital image processing apparatus of FIG. 3 and portions to be read from the buffer 60. A first image file and a second image file may be stored in the storage medium 70. As illustrated in FIG. 4A, the buffer 60 may store information about a first synthesized image Im1+Im2 in which a first image Im1 corresponding to the first image file and a second image Im2 corresponding to the second image file are disposed adjacent to each other. The buffer 60 may obtain the information from the first image file and the second image file. The buffer 60 may comprise a first region 61 and a second region 62, which are adjacent to each other. The buffer 60 may store information about the first image Im1 in the first region 61 and store information about the second image Im2 in the second region 62. The buffer 60 may thereby store information about the first synthesized image Im1+Im2, in which the first image Im1 and the second image Im2 are disposed adjacent to each other, through the first region 61 and the second region 62.

The display unit 80 may display at least one of the first image Im1, a first partial synthesized image in which a portion of the first image Im1 and a portion of the second image Im2 are disposed adjacent to each other, and the second image Im2 by using a piece of the information about the first synthesized image Im1+Im2 stored in the buffer 60. For example, when the first image Im1 is displayed on the display unit 80, the first image Im1 may be displayed on the display unit 80 by using information that is stored in the first region 61 of the buffer 60, i.e., in a portion indicated by DA in FIG. 4A. When the image displayed on the display unit 80 is converted into the second image Im2 from the first image Im1 in a sliding manner such that the image displayed on the display unit 80 can gradually become the second image Im2 when the first image Im1 is initially displayed on the display unit 80, the first partial synthesized image, in which a portion of the first image Im1 and a portion of the second image Im2 are disposed adjacent to each other, is displayed on the display unit 80. In this case, the first partial synthesized image may be displayed on the display unit 80 by using information stored in a portion DA of the first region 61 and the second region 62, as illustrated in FIG. 4B.

When the first partial synthesized image is being displayed on the display unit 80 and the image displayed on the display unit 80 is converted from the first image Im1 into the second image Im2, the percentage displayed of the first image Im1 in the first partial synthesized image varies. For example, the percentage displayed of the first image Im1 in the first partial synthesized image may be gradually decreased over time. Even in this case, information about the first synthesized image Im1+Im2 is stored in the buffer 60, as illustrated in FIGS. 4A and 4B. Thus, the appropriate first partial synthesized image may be displayed on the display unit 80 by using the corresponding piece of the information about the first synthesized image Im1+Im2 stored in the buffer 60, e.g., the portion DA illustrated in FIGS. 4A and 4B. A piece of the information that is to be read, of the information about the first synthesized image Im1+Im2 stored in the buffer 60, may be determined by controlling the display interface unit 81 which reads the information about the first synthesized image Im1+Im2 stored in the buffer 60.

Figure 1:
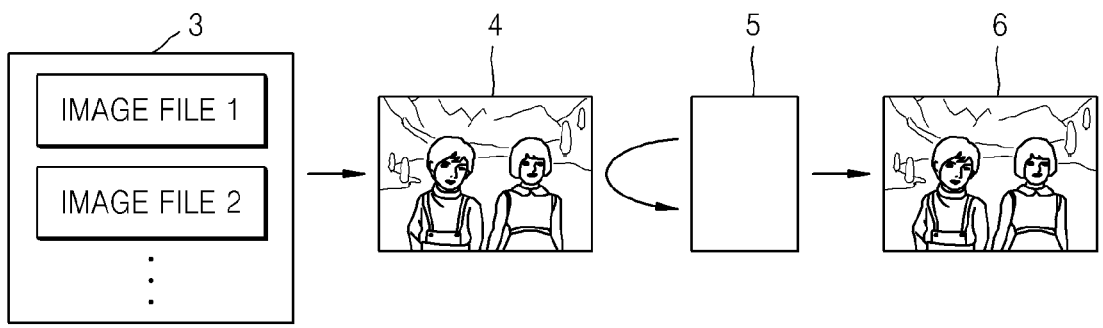
FIGS. 1 and 2 are schematic views illustrating an operation of processing an image by a conventional digital image processing apparatus.
Figure 2:
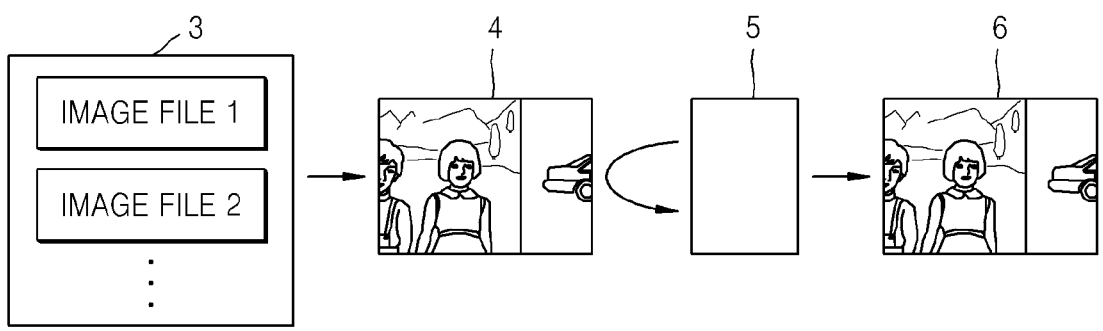

When the information about the first synthesized image Im1+Im2, in which the first image Im1 and the second image Im2 are disposed adjacent to each other, is stored in the buffer 60, the display unit 80 displaying one of the first image Im1, the first partial synthesized image, and the second image Im2 may begin to display another one of the first image Im1, the first partial synthesized image, and the second image Im2. Additionally, the percentage displayed of the first image Im1 in the first partial synthesized image may vary during display of the first partial synthesized image. In these cases, a piece of the information about the first synthesized image Im1+Im2 stored in the buffer 60 may be used. In contrast to the conventional digital image processing apparatus that is described with reference to FIGS. 1 and 2, in the exemplary digital imaging apparatus described herein, the information stored in the buffer 60 may not need to be continuously corrected or updated. Thus, the total amount of data read from the storage medium 70 into the buffer 60 can be remarkably decreased as compared to the conventional digital image processing apparatus. Therefore, a displayed image can be converted into other images by using a rapid sliding method, and the total amount of data to be read can be remarkably decreased so that a large amount of data can be read and processed by using hardware with low specification requirements.

The digital imaging apparatus may comprise an image conversion button (e.g., the manipulation unit 200) by which a user may control the image displayed on the display unit 80 of the digital imaging apparatus to be converted into other images. The user may control the digital imaging apparatus to use a sliding method to perform the image conversion. Thus, the digital imaging apparatus may store the information about the first synthesized image Im1+Im2 in the buffer 60 so that rapid and smooth image conversion can be performed. Conversion from the second image Im2 into the first image Im1 may also be performed, as well as conversion from the first image Im1 into the second image Im2. Images stored in the storage medium 70 may be continuously converted from one to another in a sliding manner and displayed on the display unit 80, as in a slide show, for example. Even in this case, image conversion may be performed in the aforementioned sliding manner.

FIGS. 3, 4A, and 4B illustrate the digital imaging apparatus as an example of a digital image processing apparatus. However, it will be appreciated that this illustration is not limiting, and thus, the illustrated digital imaging apparatus may include a digital image processing apparatus. Other examples of a digital image processing apparatus include a personal digital assistant (PDA) or a personal multimedia player (PMP).

Figure 5A:
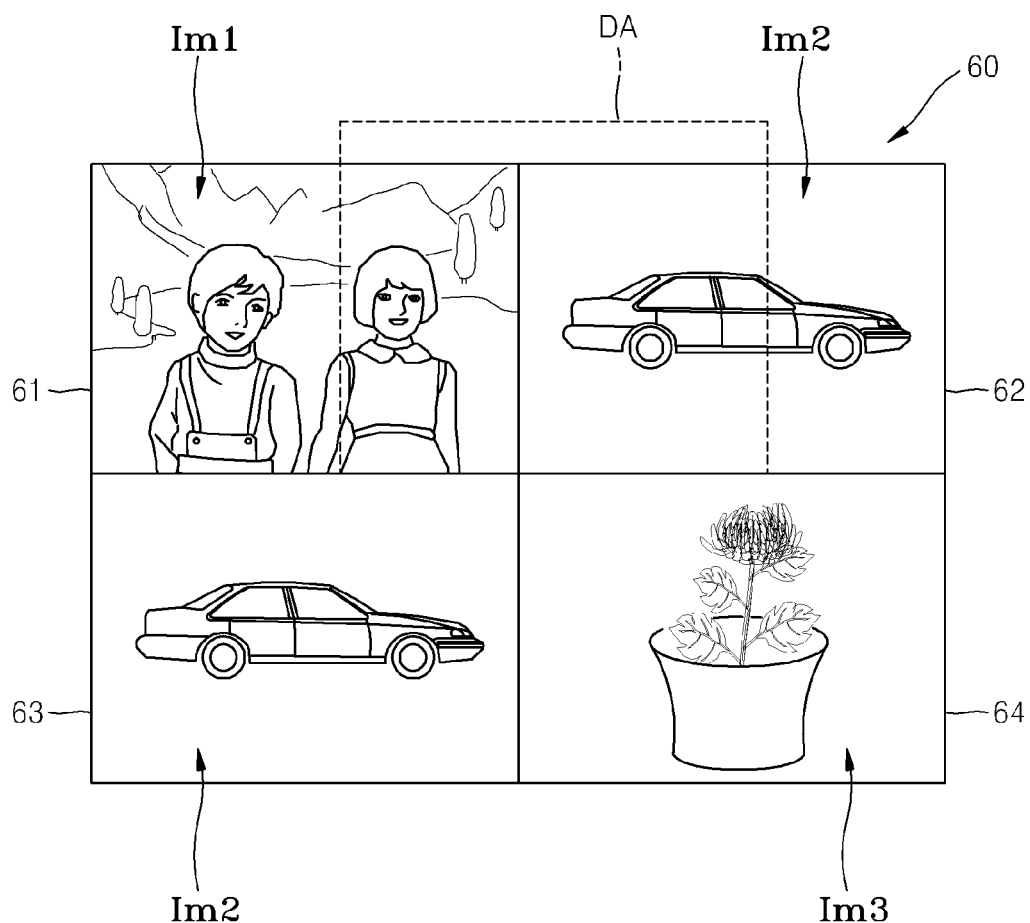
Figure 5C:
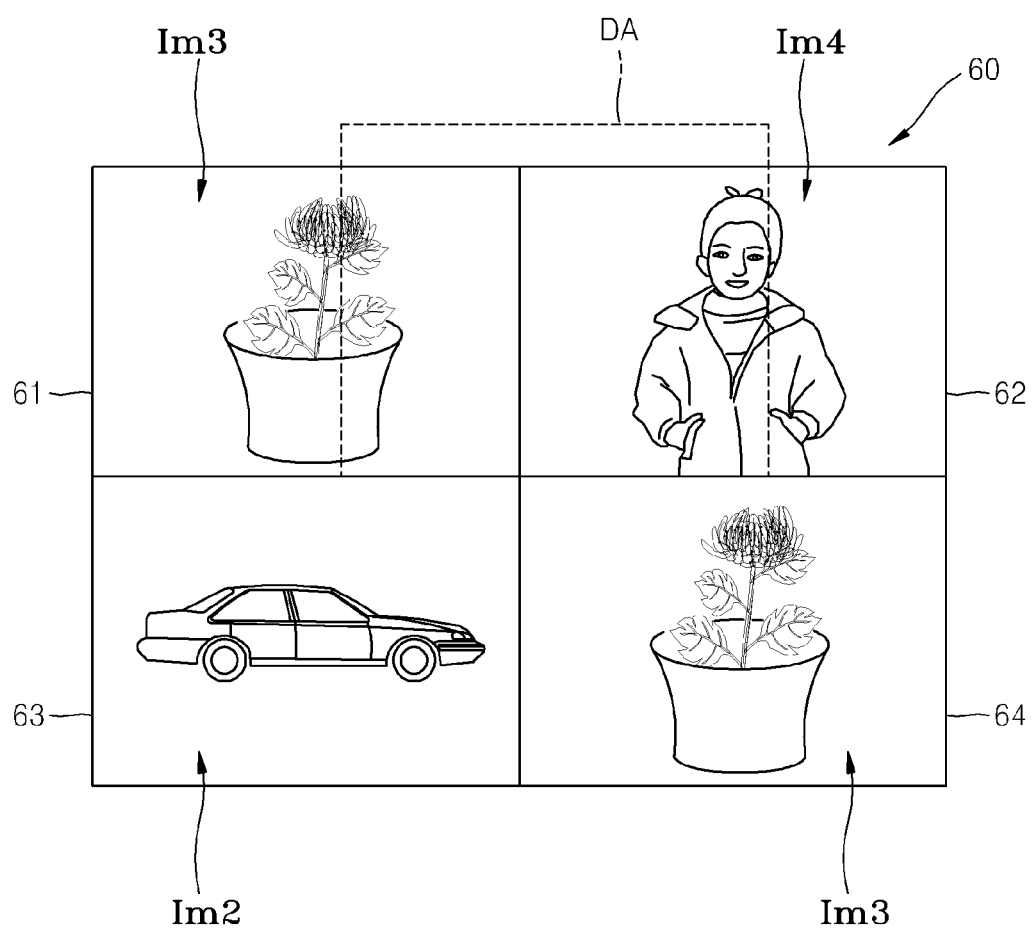

FIGS. 5A through 5C are additional exemplary schematic views illustrating images stored in the buffer 60 of the digital image processing apparatus of FIG. 3 and portions to be read from the buffer 60. A third image file, as well as the first image file and the second image file, may be stored in the storage medium 70. The buffer 60 may store information about a second synthesized image Im2+Im3 in which the second image Im2 and a third image Im3 corresponding to the third image file are disposed adjacent to each other, as well as the information about the first synthesized image Im1+Im2 in which the first image Im1 corresponding to the first image file and the second image Im2 corresponding to the second image file are disposed adjacent to each other. Accordingly, the display unit 80 may display at least one of the first image Im1, the first partial synthesized image in which a portion of the first image Im1 and a portion of the second image Im2 are disposed adjacent to each other, the second image Im2, the second partial synthesized image in which a portion of the second image Im2 and a portion of the third image Im3 are disposed adjacent to each other, and the third image Im3 by using a piece of the information about the first synthesized image Im1+Im2 and the information about the second synthesized image Im2+Im3, which are stored in the buffer 60.

The buffer 60 may comprise a first region 61, a second region 62, a third region 63, and a fourth region 64, as illustrated in FIGS. 5A-5C. The first region 61 and the second region 62 may be adjacent to each other, and the third region 63 and the fourth region 64 may be adjacent to each other. The buffer 60 may store information about the first image Im1 in the first region 61 and store information about the second image Im2 in the second region 62, thereby storing information about the first synthesized image Im1+Im2 through the first region 61 and the second region 62. In addition, the buffer 60 may also store information about the second image Im2 in the third region 63 and store information about the third image Im3 in the fourth region 64, thereby storing information about the second synthesized image Im2+Im3 through the third region 63 and the fourth region 64.

When the first image Im1 is displayed on the display unit 80, the information stored in the first region 61 may be used. When the image displayed on the display unit 80 is converted from the first image Im1 into the second image Im2 in a sliding manner, information about a portion including the first region 61 and the second region 62, which is indicated by DA in FIG. 5A, may be used. The portion displayed on the display unit 80 may include the first partial synthesized image, in which a portion of the first image Im1 and a portion of the second image Im2 are disposed adjacent to each other. When the first partial synthesized image is being displayed on the display unit 80 and the percentage displayed of the first image Im1 in the first partial synthesized image is decreased, information already stored in the buffer 60 may be used without the need of storing additional information in the buffer 60.

This process also applies to the case when the second image Im2 is displayed on the display unit 80 and the image displayed is converted into the third image Im3 in a sliding manner. In this case, a second partial synthesized image may be displayed on the display unit 80 by using the information about the second synthesized image Im2+Im3 stored in the third region 63 and the fourth region 64. When information indicated by DA in FIG. 5B is used, the second partial synthesized image is displayed on the display unit 80. The image displayed on the display unit 80 may be converted from the second image Im2 into the third image Im3 in a sliding manner in which initially, only the second image Im2 (and not the third image Im3) is displayed on the display unit 80, and in response to a signal input by the user, the second partial synthesized image begins to be displayed as the percentage displayed of the third image Im3 in the second partial synthesized image is increased. Even in this case, information stored in the buffer 60 may be used without being corrected or updated. A piece of the information about the first synthesized image Im1+Im2 and the information about the second synthesized image Im2+Im3, which are stored in the buffer 60, may be read by using the display interface unit 81, as described in the aforementioned embodiment.

A fourth image file, as well as the first through third image files, may be stored in the storage medium 70. Thus, when the information illustrated in FIG. 5B is stored in the buffer 60 and the display unit 80 displays the third image Im3, a fourth image Im4 corresponding to the fourth image file may be anticipated to be displayed next on the display unit 80, for example by using a slide show or according to the user's manipulation of the manipulation unit 200. Thus, when the display unit 80 displays the third image Im3, the buffer 60 may prepare to display the fourth image Im4 as illustrated in FIG. 5C.

In an example, the display unit 80 initially displays the third image Im3. Thus, the image displayed by the display unit 80 according to input from the user may be converted from the third image Im3 into the second image Im2 as well as into the fourth image Im4. Thus, in order to prepare to display the fourth image Im4 as well as remain ready to display the second image Im2, in the buffer 60 having the information illustrated in FIG. 5B, a portion of the buffer 60 including regions 63 and 64 which have the information about the second synthesized image Im2+Im3 may be maintained, and a portion including regions 61 and 62 which have the information about the first synthesized image Im1+Im2 may be overwritten. Accordingly, as illustrated in FIG. 5C, information about the third image Im3 may stored in the first region 61 of the buffer 60, and information about the fourth image Im4 may be stored in the second region 62 of the buffer 60, such that information about a third synthesized image Im3+Im4, in which the third image Im3 and the fourth image Im4 are disposed adjacent to each other, can be stored in the first region 61 and the second region 62 without interrupting the display of the second image Im2, third image Im3, or second synthesized image Im2+Im3 using the third region 63 and the fourth region 64 of the buffer 60. In an embodiment, the information about the third image Im3 may be easily stored in the first region 61 by copying the information about the third image Im3 that has already been stored in the fourth region 64.

When the first through fourth image files are stored in the storage medium 70 and information about the first image file Im1, second image file Im2, and third image file Im3 are stored in the buffer 60 as illustrated in FIG. 5B, and the display unit 80 displays the third image Im3, the buffer 60 may prepare to display the fourth image Im4. In other words, when the display unit 80 displays the second partial synthesized image Im2+Im3 (stored in the third region 63 and the fourth region 64) and the percentage displayed of the second image Im2 in the second partial synthesized image Im2+Im3 is equal to or less than a predetermined percentage, the information about the third synthesized image Im3+Im4 may be stored in the first region 61 and the second region 62 of the buffer 60 such that the display unit 80 can prepare to display the fourth image Im4. The percentage displayed of the second image Im2 in the second partial synthesized image Im2+Im3 being equal to or less than a predetermined percentage may indicate that preparations need to be made for the conversion of the image displayed on the display unit 80 from the third image Im3 into the fourth image Im4. Thereafter, when the image displayed on the display unit 80 is converted from the third image Im3 into the fourth image Im4 (e.g., in response to a signal that is input by the user), information indicated by DA in FIG. 5C may be used.

When the display unit 80 displays the fourth image Im4 or the third partial synthesized image in which a portion of the third image Im3 and a portion of the fourth image Im4 are disposed adjacent to each other, which are stored in the buffer 60 as illustrated in FIG. 5C, and the percentage displayed of the third image Im3 in the third partial synthesized image is equal to or less than a predetermined percentage, information about a fifth image may need to be stored in the buffer 60 in preparation for display on the display unit 80. Thus, in this case, the information about the fourth image Im4 and information about the fifth image may be stored in the third region 63 and the fourth region 64, respectively, replacing the information about the second synthesized image Im2+Im3, without interrupting the display of the information about the third synthesized image Im3+Im4, such as the portion indicated by DA in FIG. 5C.

FIG. 6 is a flowchart illustrating an exemplary method of controlling a digital image processing apparatus. In operation S11, information about a first synthesized image, in which a first image corresponding to a first image file and a second image corresponding to a second image file are disposed adjacent to each other, is obtained from the first image file and the second image file. The information about the first synthesized image may be stored in a buffer such that when the image displayed on the display unit is converted from the first image into the second image, a piece of the information about the first synthesized image stored in the buffer may be used.

Thereafter, in operation S21, at least one of the first image, the first partial synthesized image, and the second image is displayed on a display unit by using a piece of the information about the first synthesized image that is obtained in operation S11. The first partial synthesized image may include a portion of the first image and a portion of the second image disposed adjacent to each other. When the first partial synthesized image is being displayed, the percentage displayed of the first image in the first partial synthesized image may be increased or decreased. In this case, the piece of the information about the first synthesized image that has been already obtained and stored in the buffer may be used without being corrected or updated.

Additionally, in operation S21, the first image, the first partial synthesized image, and the second image may be sequentially displayed on the display unit. The percentage displayed of the first image in the first partial synthesized image may vary over time during display of the first partial synthesized image. The percentage displayed of the first image in the first partial synthesized image may vary as in a slide show, for example. At least one of the first image, the first partial synthesized image, and the second image may be displayed on the display unit according to the user's input. The percentage displayed of the first image in the first partial synthesized image may vary in real-time according to the user's input during display of the first partial synthesized image.

FIG. 7 is a flowchart illustrating another exemplary method of controlling a digital image processing apparatus. In operation S12, information about a first synthesized image, in which a first image corresponding to a first image file and a second image corresponding to a second image file are disposed adjacent to each other, and information about a second synthesized image, in which the second image and a third image corresponding to a third image file are disposed adjacent to each other, are obtained from the first image file, the second image file, and the third image file. The information about the first synthesized image and the information about the second synthesized image may be stored in a buffer. When the image displayed on the display unit is converted from the first image into the second image, or from the second image into the third image, a piece of the information about the first synthesized image and the information about the second synthesized image, which may be stored in the buffer, may be used.

The buffer may be divided into four regions, and the information about the first image and the information about the second image may be respectively stored in the first region and the second region. The first region and the second region may be adjacent to each other such that the information about the first synthesized image can be stored through the first region and the second region. Likewise, the information about the second image and the information about the third image may be respectively stored in the third region and the fourth region. The third region and the fourth region may be adjacent to each other such that the information about the second synthesized image may be stored through the third region and the fourth region, as described with reference to FIG. 5A in an aforementioned embodiment. When the third image is displayed on the display unit, the information about the third image and the information about the fourth image may be stored in the first region and the second region of the buffer, respectively, such that the information about the third synthesized image, in which the third image and the fourth image are disposed adjacent to each other, can be stored in the first region and the second region. When the percentage displayed of the second image in the second partial synthesized image is equal to or less than a predetermined percentage and the second partial synthesized image is being displayed on the display unit, the information about the third image and the information about the fourth image may be stored in the first region and the second region of the buffer, respectively, so that the information about the third synthesized image can be stored in the first region and the second region.

Thereafter, in operation S22, at least one of the first image, the first partial synthesized image, the second image, the second partial synthesized image, and the third image is displayed on a display unit by using a piece of the information about the first synthesized image and the information about the second synthesized image, which are obtained in operation S12. The first image, the first partial synthesized image, the second image, the second partial synthesized image, and the third image may be sequentially displayed on the display unit. The percentage displayed of the first image in the first partial synthesized image may vary over time during display of the first partial synthesized image. Likewise, the percentage displayed of the second image in the second partial synthesized image may vary over time during display of the second partial synthesized image. An example application may include a slide show.

In another example, at least one of the first image, the first partial synthesized image, the second image, the second partial synthesized image, and the third image may be displayed on the display unit according to the user's input (e.g., manipulation of a manipulation unit 200). In this case, the percentage displayed of the first image in the first partial synthesized image may vary in response to a signal input by the user when the first partial synthesized image is being displayed on the display unit, and the percentage displayed of the second image in the second partial synthesized image may vary in response to the signal input by the user when the second partial synthesized image is being displayed on the display unit.

A program for executing a method of controlling the digital image processing apparatus according to the aforementioned embodiments or modifications thereof in the digital image processing apparatus may be stored in a computer readable storage medium. The storage medium may include the storage medium 70, as illustrated in FIG. 3. The storage medium may also include other storage mediums. Examples of the storage medium include magnetic storage media (e.g., floppy disks or hard disks), optical recording media (e.g., CD-ROMs or digital versatile disks (DVDs)), and electronic storage media (e.g., integrated circuits (IC's), ROM, RAM, or flash memory).

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. It will be recognized that the terms "comprising," "including," and "having," as used herein, are specifically intended to be read as open-ended terms of art.

What is claimed is:

1. A digital image processing apparatus, the apparatus comprising:
    a storage medium in which a first image file and a second image file are stored;
    a buffer in which information about a first synthesized image is stored, the first synthesized image comprising a first image corresponding to the first image file and a second image corresponding to the second image file disposed adjacent to each other, the information being obtained from the first image file and the second image file; and
    a display unit that displays the first image, a first partial synthesized image, and the second image in sequence by using a piece of the information about the first synthesized image, which is stored in the buffer, said piece comprising a portion of the first image and a portion of the second image disposed adjacent to each other;
    wherein, when the display unit displaying one of the first image, the first partial synthesized image, and the second image begins to display another one of the first image, the first partial synthesized image, and the second image, the piece of the information about the first synthesized image, which is used for displaying, is varied by changing a region at which the piece of the information about the first synthesized image is obtained from the buffer in order to vary the percentage of the first image and the second image to be displayed without correcting the first synthesized image stored in the buffer.

2. The apparatus of claim 1, further comprising a display interface unit that reads the piece of the information about the first synthesized image, which is stored in the buffer, wherein the display unit displays at least one of the first image, the first partial synthesized image, and the second image using information that is read by the display interface unit.

3. The apparatus of claim 1, wherein a third image file is stored in the storage medium, information about a second synthesized image is stored in the buffer, the second synthesized image comprising the second image and a third image corresponding to the third image file disposed adjacent to each other, and the display unit displays at least one of the first image, the first partial synthesized image, the second image, a second partial synthesized image, and the third image by using the piece of the information about the first synthesized image and the information about the second synthesized image, which are stored in the buffer, said piece of the information of the second synthesized image comprising a portion of the second image and a portion of the third image disposed adjacent to each other.

4. The apparatus of claim 3, further comprising a display interface unit
    that reads the piece of the information about the first synthesized image and the information about the second synthesized image, which are stored in the buffer, wherein the display unit displays at least one of the first image, the first partial synthesized image, the second image, the second partial synthesized image, and the third image using information that is read by the display interface unit.

5. The apparatus of claim 3, wherein, when the display unit displaying one of the first image, the first partial synthesized image, the second image, the second partial synthesized image, and the third image begins to display another one of the first image, the first partial synthesized image, the second image, the second partial synthesized image, and the third image, the piece of the information about the first synthesized image and the information about the second synthesized image that is used for displaying is varied.

6. The apparatus of claim 3, wherein, when the percentage displayed of the first image in the first partial synthesized image during display of the first partial synthesized image varies or when the percentage displayed of the second image in the second partial synthesized image during display of the second partial synthesized image varies, the piece of the information about the first synthesized image and the information about the second synthesized image that is used for displaying is varied.

7. The apparatus of claim 3, wherein the buffer comprises a first region, a second region adjacent to the first region, a third region, and a fourth region adjacent to the third region, information about the first image being stored in the first region and information about the second image being stored in the second region such that the information about the first synthesized image can be stored in the first region and the second region, and information about the second image being stored in the third region and information about the third image being stored in the fourth region such that the information about the second synthesized image can be stored in the third region and the fourth region.

8. The apparatus of claim 7, wherein a fourth image file is stored in the storage medium, and when the display unit displays the third image, the information about the third image is stored in the first region of the buffer and information about a fourth image corresponding to the fourth image file is stored in the second region of the buffer, such that information about a third synthesized image can be stored in the first region and the second region, the third synthesized image comprising the third image and the fourth image disposed adjacent to each other.

9. The apparatus of claim 7, wherein a fourth image file is stored in the storage medium, and when the percentage displayed of the second image in the second partial synthesized image is less than or equal to a predetermined percentage during display of the second partial synthesized image, the information about the third image is stored in the first region of the buffer and information the fourth image is stored in the second region of the buffer such that information about a third synthesized image can be stored in the first region and the second region, the third synthesized image comprising the third image and the fourth image disposed adjacent to each other.

10. A method of controlling a digital image processing apparatus, the method comprising:
obtaining information about a first synthesized image, the first synthesized image comprising a first image corresponding to a first image file and a second image corresponding to a second image file disposed adjacent to each other, the information obtained from the first image file and the second image file; and
displaying the first image, a first partial synthesized image, and the second image in sequence on a display unit by using a piece of the information about the first synthesized image, said piece comprising a portion of the first image and a portion of the second image disposed adjacent to each other;
wherein the obtaining of the information about the first synthesized image further comprises storing the information in a buffer, and the displaying of the first image, the first partial synthesized image, and the second image comprises using the piece of the information about the first synthesized image, which is stored in the buffer; and
wherein when one of the first image, the first partial synthesized image, and the second image is displayed on the display unit and another one of the first image, the first partial synthesized image, and the second image begins to be displayed, the piece of the information about the first synthesized image that is used for the displaying is varied by changing a region at which the piece of the information about the first synthesized image is obtained from the buffer in order to vary the percentage of the first image and the second image to be displayed without correcting the first synthesized image stored in the buffer.

11. The method of claim 10, wherein when the first partial synthesized image is being displayed on the display unit, the percentage displayed of the first image in the first partial synthesized image varies over time.

12. The method of claim 10, wherein the displaying of the first image, the first partial synthesized image, and the second image on the display unit is in response to a signal that is input by a user.

13. The method of claim 12, wherein when the first partial synthesized image is being displayed on the display unit, the percentage displayed of the first image in the first partial synthesized image varies in response to a signal that is input by the user.

14. The method of claim 10, wherein when the percentage displayed of the first image in the first partial synthesized image varies during display of the first partial synthesized image, the piece of the information about the first synthesized image that is used for the displaying is varied.

15. A method of controlling a digital image processing apparatus, the method comprising:
obtaining information about a first synthesized image from a first image file and a second image file, the first synthesized image comprising a first image and a second image disposed adjacent to each other, the first image corresponding to the first image file and the second image corresponding to the second image file;
obtaining information about a second synthesized image from the second image file and a third image file, the second synthesized image comprising the second image and a third image disposed adjacent to each other, the third image corresponding to the third image file; and
displaying the first image, a first partial synthesized image, the second image, a second partial synthesized image, and the third image in sequence on a display unit by using a piece of the information about the first synthesized image and the information about the second synthesized image, said piece of the information about the first synthesized image comprising a portion of the first image and a portion of the second image disposed adjacent to each other, and said piece of the information about the second synthesized image comprising a portion of the second image and a portion of the third image disposed adjacent to each other;
wherein the obtaining of the information about the first synthesized image and the information about the second synthesized image further comprises storing the information about the first synthesized image and the information about the second synthesized image in a buffer, and wherein the displaying of the first image, the first partial synthesized image, the second image, the second partial synthesized image, and the third image in sequence on the display unit comprises using the piece of the information about the first synthesized image and the information about the second synthesized image that are stored in the buffer; and
wherein when one of the first image, the first partial synthesized image, the second image, the second partial synthesized image, and the third image is displayed on the display unit and another one of the first image, the first partial synthesized image, the second image, the second partial synthesized image, and the third image begins to be displayed, the piece of the information about the first synthesized image and the information about the second synthesized image that is used for displaying is varied by changing a region at which the piece of the information about the first synthesized image and the information about the second synthesized image is obtained from the buffer in order to vary the percentage of the first image and the second image to be displayed and the percentage of the second image and the third image to be displayed without correcting the first synthesized image and the second synthesized image stored in the buffer.

16. The method of claim 15, wherein when the first partial synthesized image is being displayed on the display unit, the percentage displayed of the first image in the first partial synthesized image varies over time, and wherein when the second partial synthesized image is being displayed on the display unit, the percentage displayed of the second image in the second partial synthesized image varies over time.

17. The method of claim 15, wherein the first image, the first partial synthesized image, the second image, the second partial synthesized image, and the third image are displayed on the display unit in response to a signal that is input by a user.

18. The method of claim 17, wherein during display of the first partial synthesized image, the percentage displayed of the first image in the first partial synthesized image varies in response to a signal that is input by the user, and during display of the second partial synthesized image, the percentage displayed of the second image in the second partial synthesized image varies in response to a signal that is input by the user.

19. The method of claim 15, wherein when the percentage displayed of the first image in the first partial synthesized image varies during display of the first partial synthesized image or when the percentage displayed of the second image in the second partial synthesized image varies during display of the second partial synthesized image, the piece of the information about the first synthesized image and the information about the second synthesized image that is used for the displaying is varied.

20. The method of claim 15, wherein the obtaining of the information about the first synthesized image and the information about the second synthesized image comprises dividing the buffer into first through fourth regions, storing information about the first image and information about the second image in adjacent first and second regions respectively such that the information about the first synthesized image can be stored in the first region and the second region, and storing information about the second image and information about the third image in adjacent third and fourth regions respectively such that the information about the second synthesized image can be stored in the third region and the fourth region.

21. The method of claim 20, further comprising, when the third image is displayed on the display unit, storing information about the third image and information about the fourth image in the first and second regions of the buffer respectively such that the information about a third synthesized image can be stored in the first region and the second region, the third synthesized image comprising the third image and the fourth image disposed adjacent to each other.

22. The method of claim 20, further comprising, when the percentage displayed of the second image in the second partial synthesized image is less than or equal to a predetermined percentage during display of the second partial synthesized image, storing the information about the third image and the information about the fourth image in the first region and the second region of the buffer respectively such that the information about a third synthesized image can be stored in the first region and the second region, the third synthesized image comprising the third image and the fourth image disposed adjacent to each other.

23. A non-transitory computer readable storage medium having stored thereon a program executable by a processor to perform a method comprising:
   obtaining information about a first synthesized image, the first synthesized image comprising a first image corresponding to a first image file and a second image corresponding to a second image file disposed adjacent to each other, the information obtained from the first image file and the second image file; and
   displaying the first image, a first partial synthesized image, and the second image in sequence on a display unit by using a piece of the information about the first synthesized image, said piece comprising a portion of the first image and a portion of the second image disposed adjacent to each other;
   wherein the obtaining of the information about the first synthesized image further comprises storing the information in a buffer, and the displaying of the first image, the first partial synthesized image, and the second image comprises using the piece of the information about the first synthesized image, which is stored in the buffer; and
   wherein when one of the first image, the first partial synthesized image, and the second image is displayed on the display unit and another one of the first image, the first partial synthesized image, and the second image begins to be displayed, the piece of the information about the first synthesized image that is used for the displaying is varied by changing a region at which the piece of the information about the first synthesized image is obtained from the buffer in order to vary the percentage of the first image and the second image to be displayed without correcting the first synthesized image stored in the buffer.

24. A non-transitory computer readable storage medium having stored thereon a program executable by a processor to perform a method comprising:
   obtaining information about a first synthesized image from a first image file and a second image file, the first synthesized image comprising a first image and a second image disposed adjacent to each other, the first image corresponding to the first image file and the second image corresponding to the second image file;
   obtaining information about a second synthesized image from the second image file and a third image file, the second synthesized image comprising the second image and a third image disposed adjacent to each other, the third image corresponding to the third image file; and
   displaying the first image, a first partial synthesized image, the second image, a second partial synthesized image, and the third image in sequence on a display unit by using a piece of the information about the first synthesized image and the information about the second synthesized image, said piece of the information of the first partial synthesized image comprising a portion of the first image and a portion of the second image disposed adjacent to each other, and said piece of the information of the second partial synthesized image comprising a portion of the second image and a portion of the third image disposed adjacent to each other;
   wherein when one of the first image, the first partial synthesized image, the second image, a second partial synthesized image, and the third image is displayed on the display unit and another one of the first image, the first partial synthesized image, the second image, a second partial synthesized image, and the third image begins to be displayed, the piece of the information about the first synthesized image and the information about the second synthesized image, which is stored in the buffer, is varied by changing a region at which the piece of the information about the first synthesized image and the information about the second synthesized image is obtained from the buffer in order to vary the percentage of the first image and the second image to be displayed and the percentage of the second image and the third image to be displayed without correcting the first synthesized image and the second synthesized image stored in the buffer.

\* \* \* \* \*